(12) United States Patent
Yin et al.

(10) Patent No.: US 8,824,138 B2
(45) Date of Patent: Sep. 2, 2014

(54) HEAT DISSIPATION SYSTEM WITH DIMM BAFFLE

(75) Inventors: Xiu-Zhong Yin, Shenzhen (CN);
Xiu-Quan Hu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 205 days.

(21) Appl. No.: 13/525,619

(22) Filed: Jun. 18, 2012

(65) Prior Publication Data

US 2013/0155625 A1 Jun. 20, 2013

(30) Foreign Application Priority Data

Dec. 14, 2011 (CN) .......................... 2011 1 0417489

(51) Int. Cl.
*H05K 7/20* (2006.01)

(52) U.S. Cl.
USPC ....... 361/679.51; 361/716; 361/721; 361/690

(58) Field of Classification Search
None
See application file for complete search history.

(56) References Cited

U.S. PATENT DOCUMENTS

| | | | |
|---|---|---|---|
| 7,298,625 B1 * | 11/2007 | Wu et al. | 361/735 |
| 7,379,297 B2 * | 5/2008 | Peterson et al. | 361/690 |
| 7,486,520 B2 * | 2/2009 | Tang et al. | 361/729 |
| 8,102,651 B2 * | 1/2012 | Bland et al. | 361/695 |
| 8,413,945 B2 * | 4/2013 | Chen et al. | 248/500 |
| 8,493,738 B2 * | 7/2013 | Chainer et al. | 361/700 |
| 8,570,731 B2 * | 10/2013 | Zhang et al. | 361/679.32 |
| 8,570,740 B2 * | 10/2013 | Cong et al. | 361/694 |
| 8,665,587 B2 * | 3/2014 | Peng et al. | 361/679.32 |

* cited by examiner

*Primary Examiner* — Boris Chervinsky
(74) *Attorney, Agent, or Firm* — Novak Druce Connolly Bove + Quigg LLP

(57) ABSTRACT

A baffle guides airflow into two heat areas in a heat dissipation system. Each of the two heat areas includes a plurality of slots. The baffle includes a main body, an interval portion, and a clasp. The interval portion is located on the main body. The clasp is located on the main body opposite to the interval portion. The clasp includes a resilient clip and a stand portion vertically located on the resilient clip. The stand portion is engaged with at least one of the slots. The interval portion extends between two of the plurality of slots.

18 Claims, 6 Drawing Sheets

HEAT DISSIPATION SYSTEM WITH DIMM BAFFLE

BACKGROUND

1. Technical Field

The present disclosure relates to a heat dissipation system with a DIMM baffle for guiding airflow.

2. Description of Related Art

A computer may include a lot of heat generating elements, such as CPUs, Dual Inline Memory Modules (DIMMS), PCI cards and the like. These heat-generating elements are located on a same motherboard of the computer, and the heat produced by the elements may be dissipated by a plurality of system fans blowing from an inlet of the computer to an outlet of the computer. In this way, some elements close to the outlet of the computer may experience low heat dissipation due to the airflow being already heated. There is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
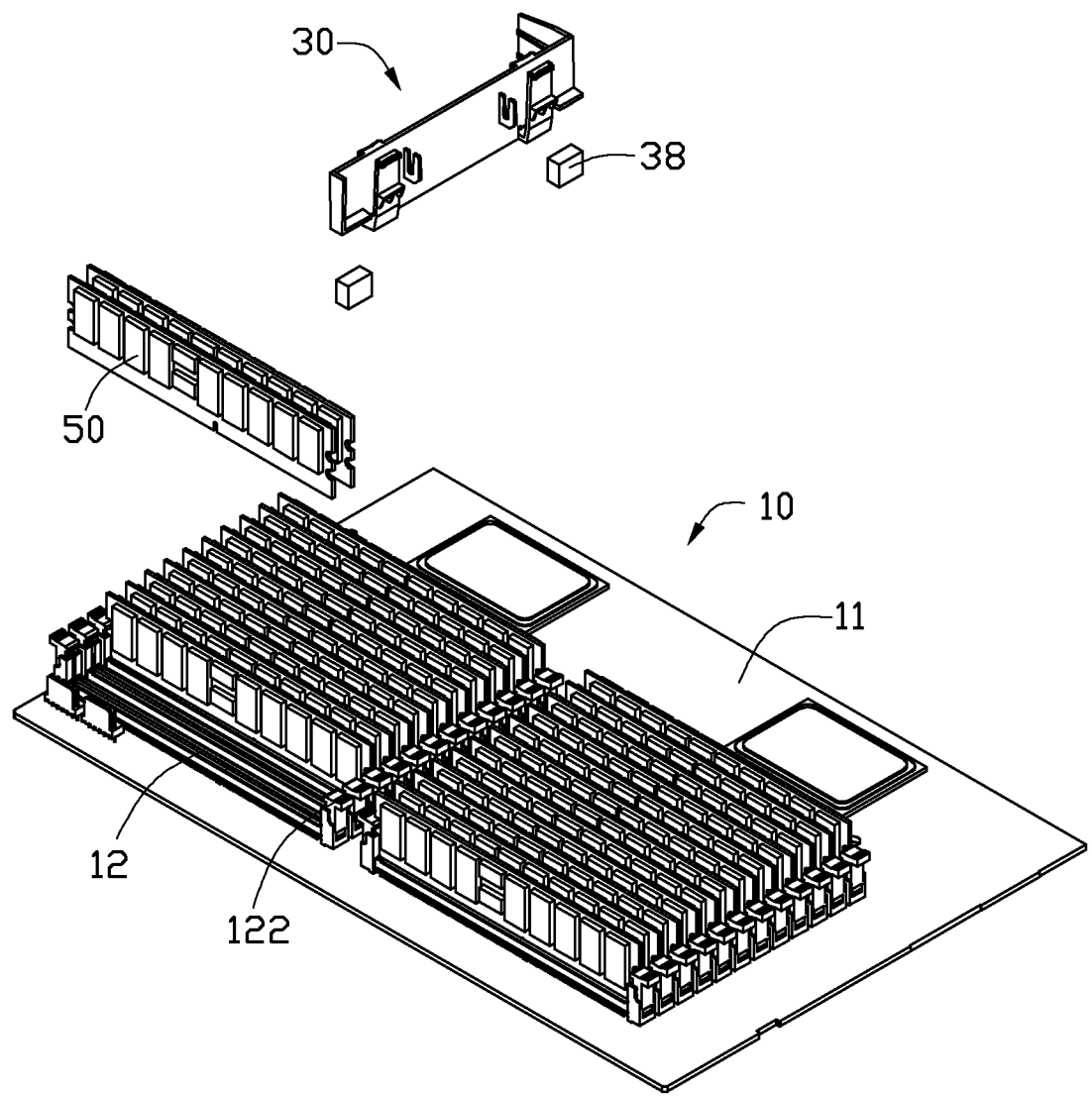
FIG. 1 is an exploded, isometric view of a heat dissipation system in one embodiment.

Referring to FIG. 1, in one embodiment, a heat dissipation system includes a motherboard 10 and a dual inline memory module (DIMM) baffle 30.

The motherboard 10 includes a printed circuit board (PCB) 11 and two heat areas located on the PCB 11. Each of the two heat areas includes a plurality of parallel DIMM slots 12. The DIMM slots 12 can receive a plurality of DIMMS 50. Each of the plurality of parallel DIMM slots 12 includes a pair of buckles 122. The plurality of parallel DIMM slots 12 can be evenly spaced.

Figure 2:
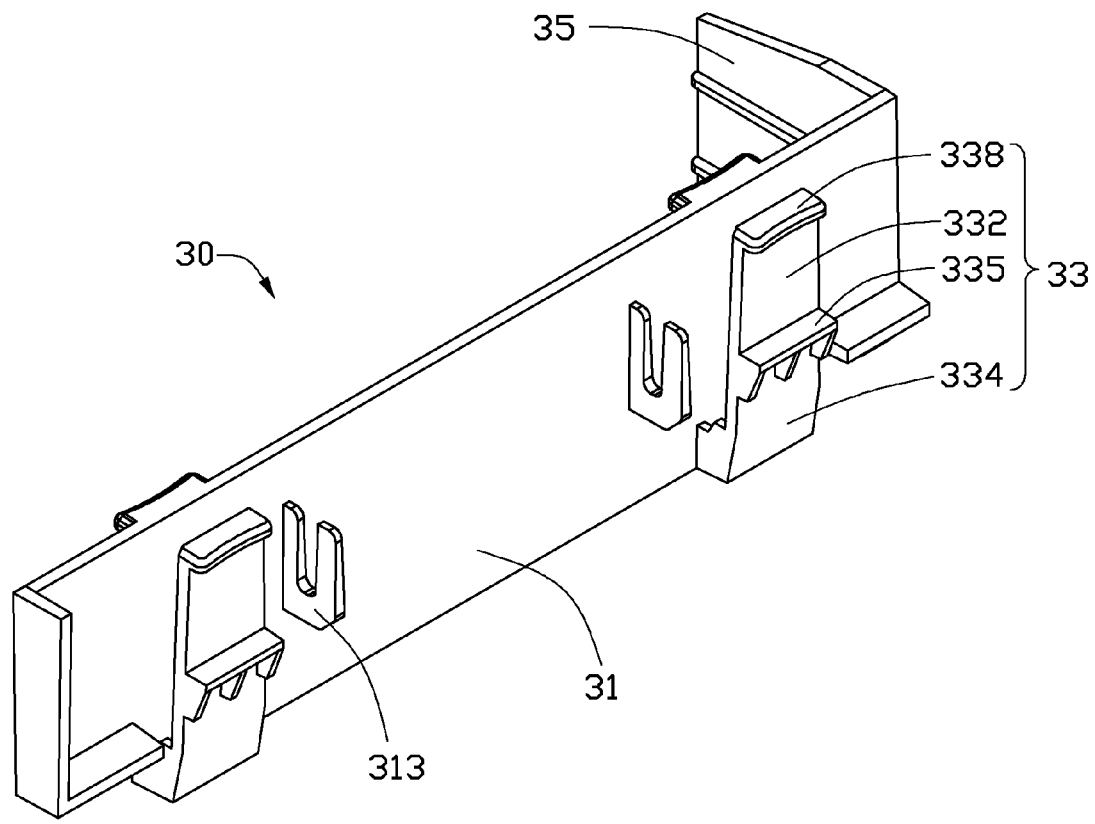
FIG. 2 is an isometric view of a DIMM baffle of FIG. 1.
Figure 3:
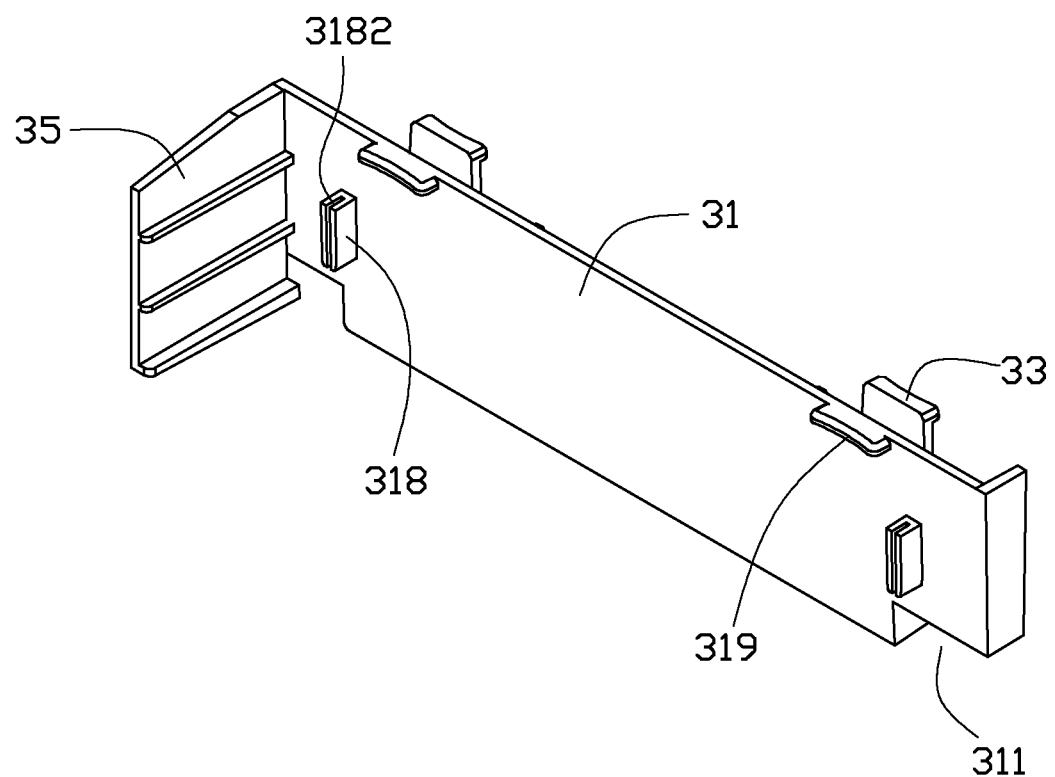
FIG. 3 is similar to FIG. 2, but shown from another aspect.

Referring to FIG. 2 and FIG. 3, the baffle 30 includes a main body 31, two clasps 33, two interval portions 318, two first press portions 319, two resist portions 313, a thermal board 35 substantially perpendicular to the main body 31, and two foam tabs 38. The two clasps 33 are located on opposite side of the interval portions 318. The two foam tabs 38 are located on bottom side of the main body 31.

Each of the two clasps 33 includes a mounting portion 334, a clip 332, a stand portion 335 located on the clip 332, and a second press portion 338 located on a free distal end of the clip 332. A space is defined between the clip 332 and the main body 31. The clip 332 extends from the mounting portion 334 and can be resiliently deformed. The stand portion 335 is vertically located on the clip 332. The second press portion 338 defines an arcuate recess.

The two cutouts 311 are defined in the main body 31 and are located on opposite sides of the main body 31 for receiving the two foam tabs 38. The two resist portions 313 and the two clasps 33 are located on same lateral side of the main body 31. Each of the two resist portions 313 is U-shaped. A groove 3182 is vertically defined in each of the two interval portions 318. Each of the first press portions 319 defines an arcuate recess. The thermal board 35 is located at one side of the main body 31.

Figure 4:
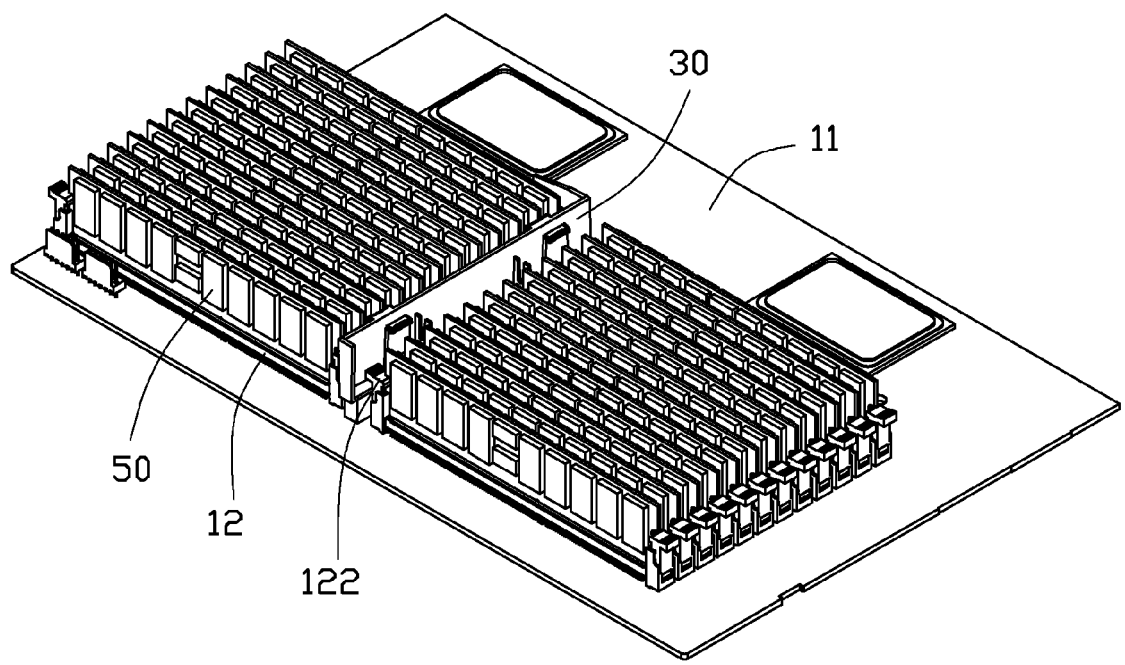
FIG. 4 is an assembled view of the heat dissipation system of FIG. 1.
Figure 5:
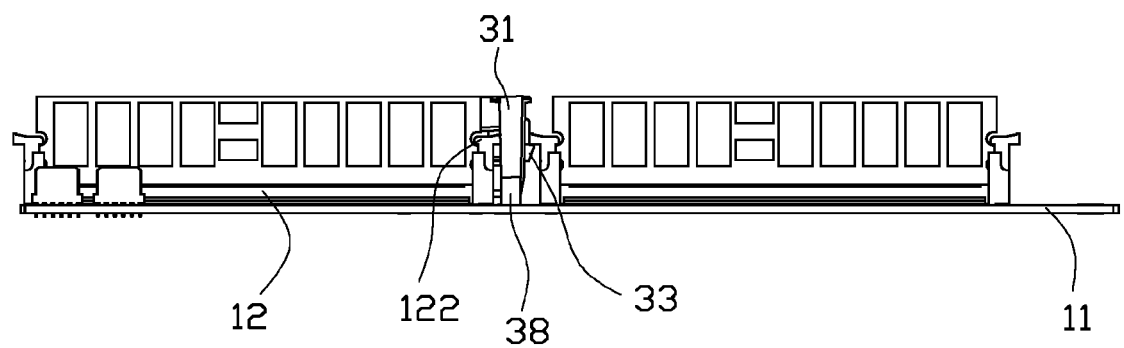
FIG. 5 a lateral view of the objects in FIG. 4.
Figure 6:
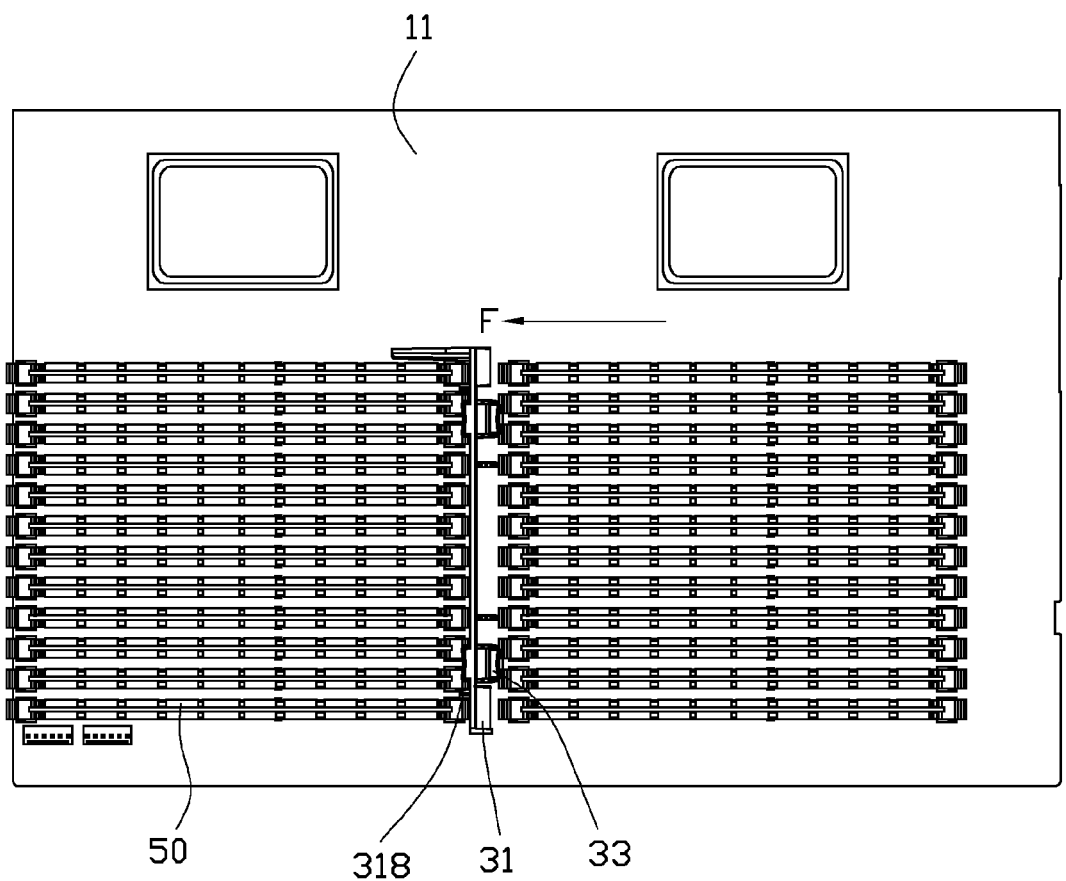
FIG. 6 is a top view of the objects in FIG. 4.

Referring through FIG. 4 to FIG. 6, in assembly, the DIMMS 50 are plugged into the DIMM slots 12. Each pair of buckles 122 clasps one DIMM 50. The DIMM baffle 30 is located above the two heat areas. The main body 31 is substantially perpendicular to each DIMM 50. The second press portions 338 are pressed so as to deform towards the main body 31. The DIMM baffle 30 moves between the two heat areas. Each of the two interval portions 318 extends into two adjacent DIMM slots 12 of the plurality of DIMM slots 12 to prevent the DIMM baffle 30 from moving along a first direction substantially perpendicular to the extending direction of the plurality of DIMM slots 12. Each of the two stand portions 335 is located under one of the plurality of buckles 122. The resist portion 313 resiliently abuts against another one of the plurality of buckles 122, to prevent the DIMM baffle 30 from moving along a second direction that is substantially parallel to the plurality of DIMM slots 12. The second press portions 338 are released allowing the clips 332 to restore back to an original state. The stand portions 335 are engaged with the buckles 122 to prevent the DIMM baffle 30 from moving away from the PCB 11.

When the heat dissipation system is working, an airflow F moving through one of the heat areas is blocked and guided by the DIMM baffle 30. The other heat area is not affected by the airflow F.

To detach, the second press portions 338 are pressed towards the main body 31. The clips 332 deform and the stand portions 335 disengage from the buckles 122. The DIMM baffle 30 can then be removed from the motherboard 10.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A heat dissipation system comprising:
   a motherboard comprising a printed circuit board (PCB) and two heat areas located on the motherboard, each of the two heat areas comprising a plurality of dual inline memory module (DIMM) slots, each of the plurality of DIMM slots comprises a buckle; and
   a DIMM baffle located between the two heat areas; the DIMM baffle comprising a main body, an interval portion, and a clasp located on the main body opposite to the interval portion; the main body is substantially perpendicular to an extending direction of the plurality of DIMM slots; and the clasp comprises a resilient clip and a stand portion located on the resilient clip, wherein the stand portion is engaged with a first buckle of the plurality of buckles, to prevent the DIMM baffle from moving away from the PCB; and the interval portion extends between two of the plurality of DIMM slots, to prevent the DIMM baffle from moving along a first direction that is substantially perpendicular to the extending direction of the plurality of DIMM slots.

2. The heat dissipation system of claim 1, wherein the DIMM baffle further comprises a resilient resist portion located on same side of the clasp; and the resilient resist portion abuts against a second buckle of the plurality of buckles, to prevent the DIMM baffle from moving a long a second direction that is substantially parallel to the plurality of DIMM slots.

3. The heat dissipation system of claim 2, wherein the resilient resist portion is U-shaped.

4. The heat dissipation system of claim 1, wherein the DIMM baffle further comprises at least one foam tab located between the main body and the PCB.

5. The heat dissipation system of claim 4, wherein the main body defines two cutouts at opposite sides, and the at least one foam tab comprises two foam tabs located on the two cutouts.

6. The heat dissipation system of claim 1, wherein the interval portion defines a groove extending along a third direction that is substantially perpendicular to the PCB.

7. The heat dissipation system of claim 1, wherein a space is defined between the main body and the resilient clip.

8. The heat dissipation system of claim 1, wherein the clasp comprises a press portion, at a distal end of the resilient clip; and the press portion defines an arcuate recess.

9. The heat dissipation system of claim 1, wherein the DIMM baffle further comprises a thermal board that is substantially perpendicular to the main body.

10. A baffle comprising:
a main body,
an interval portion located on the main body, and
a clasp located on the main body opposite to the interval portion, the clasp comprising a resilient clip and a stand portion vertically located on the resilient clip,
wherein the stand portion is engaged with at least one of plurality of slots, and the interval portion extends between two of the plurality of slots.

11. The baffle of claim 10, wherein the baffle further comprises a resilient resist portion located on same side of the clasp, and the resilient resist portion abuts against one of the plurality of slot.

12. The baffle of claim 11, wherein the resilient resist portion is U-shaped.

13. The baffle of claim 10, wherein the baffle further comprises at least one foam tab located on the main body.

14. The baffle of claim 13, wherein the main body defines two cutouts at opposite sides, and the at least one foam tab comprises two foam tabs located on the two cutouts.

15. The baffle of claim 10, wherein the interval portion defines a groove that is substantially parallel to the main body.

16. The baffle of claim 10, wherein a space is defined between the main body and the resilient clip.

17. The baffle of claim 10, wherein the clasp comprises a press portion at a distal end of the resilient clip, and the press portion defines an arcuate recess.

18. The baffle of claim 10, wherein the baffle further comprises a thermal board that is substantially perpendicular to the main body.

* * * * *